(12) United States Patent
Nakayama et al.

(10) Patent No.: US 9,066,372 B2
(45) Date of Patent: Jun. 23, 2015

(54) HEATING COOKING DEVICE

(75) Inventors: Noriyuki Nakayama, Saitama (JP);
Morihisa Hamada, Saitama (JP);
Hiroshi Misumi, Saitama (JP)

(73) Assignee: SHIBAURA ELECTRONICS CO., LTD., Saitama (JP)

( * ) Notice: Subject to any disclaimer, the term of this patent is extended or adjusted under 35 U.S.C. 154(b) by 319 days.

(21) Appl. No.: 13/877,297

(22) PCT Filed: Oct. 5, 2010

(86) PCT No.: PCT/JP2010/005962
§ 371 (c)(1),
(2), (4) Date: Apr. 5, 2013

(87) PCT Pub. No.: WO2012/046267
PCT Pub. Date: Apr. 12, 2012

(65) Prior Publication Data
US 2013/0186881 A1    Jul. 25, 2013

(51) Int. Cl.
*H05B 1/02* (2006.01)
*F24C 7/06* (2006.01)

(52) U.S. Cl.
CPC ... *H05B 1/02* (2013.01); *F24C 7/06* (2013.01)

(58) Field of Classification Search
CPC .......... F24C 7/06; H05B 1/02; H05B 1/0266;
H05B 3/0076; H05B 3/68; H05B 2213/04;
H05B 2213/07
USPC ............ 219/494, 497, 446.1, 448.11, 448.17,
219/412–414
See application file for complete search history.

(56) References Cited

U.S. PATENT DOCUMENTS

| | | | |
|---|---|---|---|
| 4,394,646 A * | 7/1983 | Gossler | 340/594 |
| 5,674,008 A | 10/1997 | Allinson | |
| 6,541,742 B2 * | 4/2003 | Neumayer | 219/518 |
| 2005/0274710 A1* | 12/2005 | Toyos et al. | 219/448.11 |
| 2008/0302782 A1* | 12/2008 | Cho | 219/448.17 |

FOREIGN PATENT DOCUMENTS

| | | |
|---|---|---|
| JP | 61-029626 A | 2/1986 |
| JP | 02-180001 A | 7/1990 |
| JP | 08-313367 A | 11/1996 |
| JP | 11-083029 A | 3/1999 |
| JP | 2001-123258 A | 5/2001 |
| JP | 2003-106537 A | 4/2003 |
| JP | 2003-303663 A | 10/2003 |
| JP | 2008-057802 A | 3/2008 |

OTHER PUBLICATIONS

International Search Report of PCT/JP2010/005962, mailing date of Jan. 18, 2011.

* cited by examiner

*Primary Examiner* — Mark Paschall
(74) *Attorney, Agent, or Firm* — Westerman, Hattori, Daniels & Adrian, LLP

(57) ABSTRACT

A heating cooking device includes a temperature sensing element that contacts a bottom surface of a top plate directly or indirectly and measures a temperature of the top plate, a spring portion one end side of which is supported by a heater unit and the other end side of which presses the temperature sensing element against the top plate, and a spring that presses the heater unit toward the top plate. An elastic force n1 with which the spring portion presses the temperature sensing element against the top plate is smaller than an elastic force n2 with which the spring presses the heater unit toward the top plate.

8 Claims, 16 Drawing Sheets

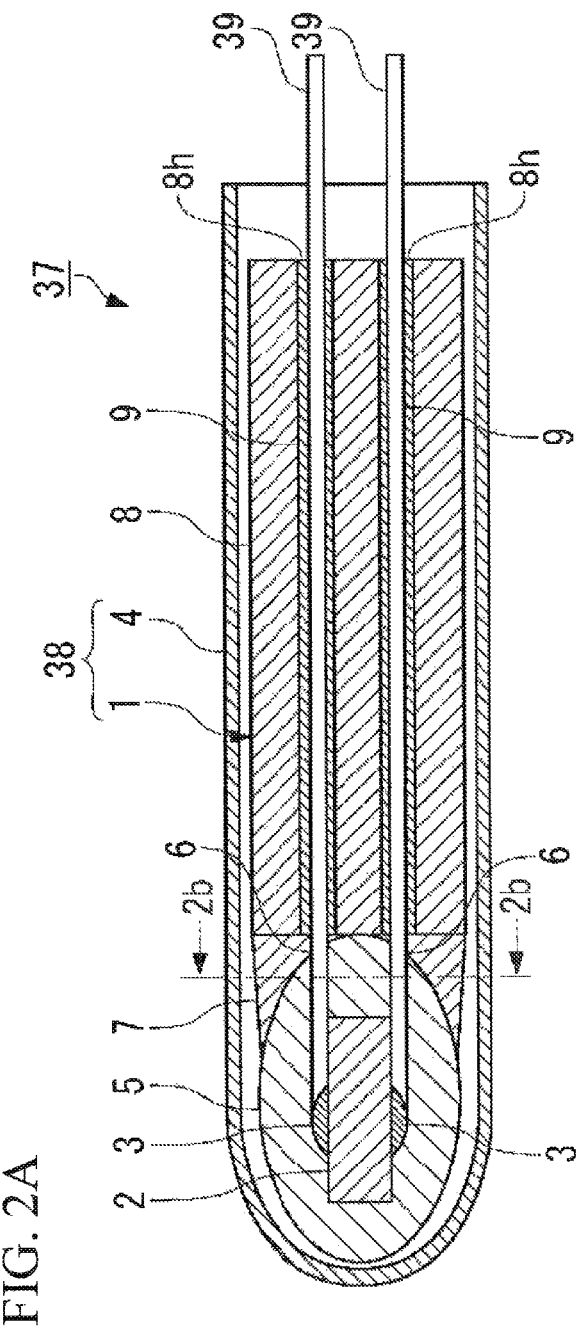

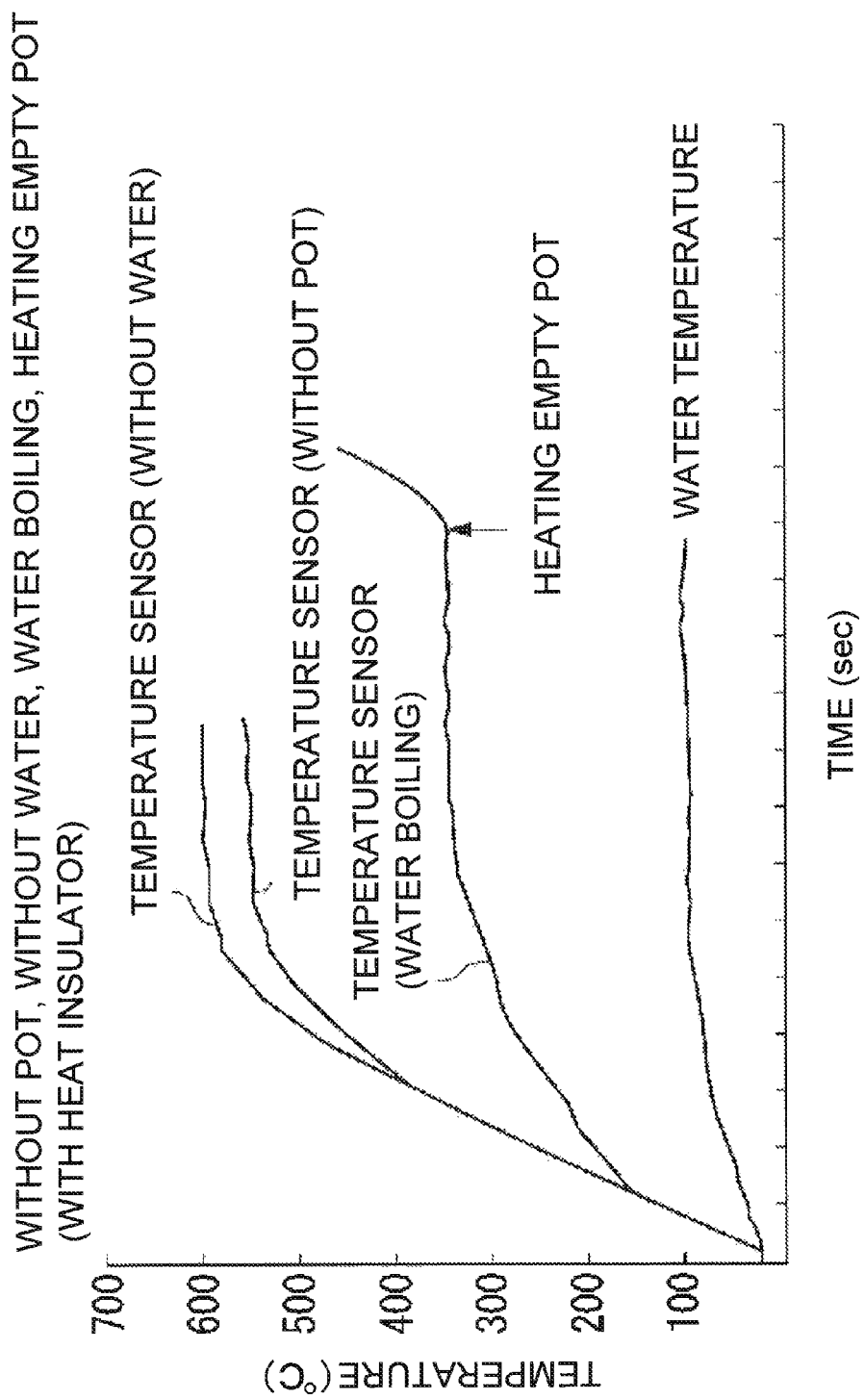

# HEATING COOKING DEVICE

TECHNICAL FIELD

The present invention relates to heating cooking devices for a household electrical appliance and for business use, and relates to heating cooking devices that include radiant heaters and are capable of controlling heating temperatures.

BACKGROUND ART

In general, heating cooking devices are divided into the heating cooking devices using gas and the heating cooking devices using electricity as heating sources.

The heating cooking devices using electricity include the heating cooking devices by induction heating (IH (Induction Heating) cooking devices) and the heating cooking devices by radiation heating represented by an electric stove and a radiant heater.

An electric stove and a radiant heater have the features that the manufacture cost thereof is about 1/10 and permit use of cooking containers such as a pot of any material, as compared with an IH cooking device, but do not have safety devices for objects being cooked (for example, prevention of a deep-frying oil fire, and burning and sticking, and prevention of cooking without a pan or a pot), and further, are not equipped with the function of cooking control (deep-frying, and water boiling).

The reasons why replacement purchases of cooking devices using electricity from gas cooking devices using fossil fuel do not advance while there is clamor for reduction of $CO_2$ include the fact that IH cooking devices fully equipped with safety devices and cooking control functions are more expansive as compared with gas devices, and that electric stoves and radiant heaters that are less expensive are accompanied by inconveniences such as being incapable of cooking fried food such as deep-fried food because the safety devices thereof are insufficient, or incapable of performing cooking control.

As shown in FIG. 12, in an IH cooking device 200, a plurality of mushroom-shaped temperature sensors 203 for detecting a temperature of an object being cooked are bonded onto a bottom surface of a top plate 204 of glass on which a cooking container P is placed, and an infrared ray sensor 205 is placed in a center, in addition to a temperature sensor 202 for detecting a temperature of an IH heating coil 201. Further, a vibration sensor 206 is placed on the bottom surface of the top plate 204 to detect boiling vibration of water boiling. As above, the IH cooking device 200 can sensitively respond to a use situation of a person who cooks by causing one kind of a plurality of kinds of detection means or the plurality of kinds of detection means in combination to function.

FIG. 13 shows a structure of a heating cooking device 100 including a general radiant heater.

In a heater unit 20, a lower part of a heating coil 21 is buried and fixed into a base portion 23 made of a heat insulator, and a metallic cover 25 protects and holds a bottom surface of the base portion 23. At a peripheral edge of the base portion 23, a spacer 24 is raised toward a top plate 11. The spacer 24 is provided to provide a predetermined space between the base portion 23 and the top plate 11. The spacer 24 may be formed integrally with the base portion 23, or may be produced as a separate piece and assembled to the base portion 23. The heater unit 20 is pressed against the top plate 11 of glass by springs 27 that support an undersurface thereof. Accordingly, the heater unit 20 can be raised and lowered with expansion and contraction of the springs 27. This is to avoid breakage of the base portion 23 and the top plate 11 due to strain by thermal expansion and contraction which occur to the base portion 23, a cover 25 and the top plate 11 with rise and decline of the temperature of the heating coil 21. Further, the springs 27 also perform action of absorbing deflection of the top plate 11 when a cooking container such as a pot drops.

The heating cooking device 100 includes a thermostat 29 on a top surface of the base portion 23 (for example, Patent Document 1 and Patent Document 2). The thermostat 29 is provided at the high power type heating cooking device 100 which has the heating coil 21 with strong power and can perform rapid heating. This is because unless output of the heating coil 21 is controlled, the temperature of the top plate 11 is likely to exceed the heatproof temperature of the glass. Therefore, the temperature of the heating coil 21 is controlled by the thermostat 29, whereby the temperature of the top plate 11 does not exceed the heatproof temperature of the glass. Accordingly, the thermostat 29 is not needed in the heating cooking device 100 in which the heating coil 21 has low power.

CITATION LIST

Patent Documents

Patent Document 1: Japanese Patent Laid-Open No. 2003-106537 (FIG. 3 rod regulator 160)
Patent Document 2: Japanese Patent Laid-Open No. 2003-303663 (FIG. 1, sensor 61)

SUMMARY OF INVENTION

Technical Problems

The conventional high power type heating cooking device 100 includes the thermostat 29. However, this merely controls the amount of passage of current which is passed to the heating coil 21 so as for the temperature of the coil 21 not to exceed the heat heatproof temperature of the glass, and cannot detect the temperature of the object being cooked during cooking. Accordingly, the conventional heating cooking device 100 cannot prevent a fire caused by an object being cooked or a fire due to misuse, or cannot control the temperature of the object being cooked.

The present invention is accomplished in view of the technical problems as above, and has an object to provide a heating cooking device including a radiant heater, that can prevent a fire caused by an object being cooked and a fire due to misuse and control a temperature of the object being cooked by detecting the temperature of the object being cooked.

Solution to Problems

It is assumed to provide a temperature sensing element in order to detect a temperature of an object being cooked, in a heating cooking device including a radiant heater. However, this has several problems to be solved.

The most basic problem is the way of keeping a contact state of the temperature sensing element to a top plate.

A heater unit of a radiant heater is produced by going through a process of temporarily fixing a heating coil that is molded into a final shape in advance to a die first, pouring a base portion forming material of a heat insulator into the die and subjecting the material to compression molding, and finally sintering the material. Therefore, the heater unit has large dimensional tolerance. In addition, expansion and contraction occur to the base portion made of the heat insulator in response to heating of the heating coil. If there is a gap between the top plate and the base portion (spacer) in order to avoid breakage of the top plate and the base portion due to difference of linear expansion coefficients of the top plate and the base portion (heat insulator), the heat which is generated by the heating coil leaks to the surroundings. If the heat leaks, there is the fear of breaking the control equipment and wiring which are disposed in the surroundings, and the object being cooked cannot be efficiently heated to a necessary level since the heat is wasted.

When the top plate is fixed to the base portion, even if the temperature does not reach the heatproof temperature of the glass, the top plate is likely to be broken as described above. Therefore, it is necessary to reduce the stress which is generated due to the dimensional tolerance of the heater unit being large, in addition to the difference of the linear expansion coefficients of the top plate and the base portion (heat insulator). Accordingly, as described above, it is necessary to adopt the structure of pressing the heater unit against the top plate by an elastic force.

Meanwhile, consideration also needs to be given to installation of a temperature sensing element. It is conceivable to bury and fix a temperature sensing element into the top plate. However, this method is not realistic, because the stress due to the difference in linear expansion coefficients between the top plate and the temperature sensing element has to be solved in some way, and the method is inferior in assemblability and maintainability of the top plate.

Therefore, it is preferable to dispose a temperature sensing element at a heater unit side, and bring the temperature sensing element into contact with the top plate. In order to absorb the difference in linear expansion coefficients between the top plate and the heater unit (base portion), and adsorb a tolerance of the heater unit further, it is necessary to bring the temperature sensing element into contact with the top plate by pressing the temperature sensing element against the top plate by an elastic force.

In addition, an elastic force N1 as above needs to be set to be lower than an elastic force N2 with which the heater unit is pressed against the top plate. This is because otherwise, the top plate and the heater unit are away from each other.

When the radiant heater in the present invention includes a heating coil, and a base portion that is made of a heat insulator and supports the heating coil, a pair of lead wires that transmit an electrical signal from the temperature sensing element are preferably led out to a bottom side of the base portion through the base portion.

The heatproof temperatures of the top plate for use in the radiant heater are, for example, approximately 600° C., and approximately 800° C. A heating temperature of the heating coil is higher than these heatproof temperatures as a matter of course, and reaches approximately 700° C. to 900° C. in some cases. Therefore, concerning the temperature distribution inside the radiant heater, the temperature of a heater wire is the highest, the temperature of the bottom surface of the top plate is the next, and the temperatures become lower in the sequence of the top surface of the top plate, the cooking container and the object being cooked.

Further, concerning the temperature distribution in a planer direction of the heating cooking device, the temperatures in the vicinity of an outer circumference and in the vicinity of an inner circumference of the heating coil which is wound around in a toroidal shape are the highest, though the temperatures of a central portion and an outer circumferential portion are substantially the same. This is because the heating coil is not arranged in the central portion of the heater unit in order to obtain an average temperature distribution as a whole.

Meanwhile, it is within a local range of about 3 to 5 cm at the largest around a contact point of the temperature sensing element and the top plate that the temperature of the top plate can be detected by the temperature sensing element, and therefore, it cannot be said that the average temperature of the top plate can be detected in a large sense. Therefore, there are the case where one temperature sensing element is provided in the central portion in the planar direction of the top plate as a representative temperature sensing element, the case where a plurality of temperature sensing elements are provided on a proper radius from the center of the heating coil which is wound around, the case where these cases are combined, and the like.

When the temperature sensing element is disposed in the central portion, it is conceivable to lead the lead wire that transmits the temperature information detected by the temperature sensing element to an outside as a signal, along the bottom surface of the top plate. However, the bottom surface of the top plate is a region at a high temperature as described above, and therefore, the lead wire with a high heatproof temperature is inevitably needed as the lead wire. Further, in this case, the lead wire needs to have a length of not less than the radius of the heating coil which is wound around, and therefore, the influences of cost increase due to use of a large amount of heat resistant material, and wire resistance caused by increase in the length of the lead wire arise. Further, there are various diameters of the heaters correspondingly to the power consumptions of the heaters, and the lengths of the wires have to be prepared in accordance with the diameters. Meanwhile, the bottom surfaces of some of the top plates have projections and depressions by dimple work in order to raise the heatproof temperature of the glass, and are not always configured by flat surfaces.

With the above description being taken into consideration, it is preferable to pass the lead wire of the temperature sensing element in such a manner as to be led out to the bottom side through the base portion (heat insulator), when the temperature sensing element is disposed in the radiant heater central portion. In this case, most part of the lead wire is disposed in the inside of the base portion, and therefore, the lead wire may be low in heat resistance. Further, since it is sufficient if only the lead wire has a length with which the lead wire penetrates through the base portion, the cost can be reduced, and the influence of the wire resistance becomes small. Further, in this case, the specifications such as the shape and dimension of the lead wire are easily unified.

In contrast with this, when a plurality of temperature sensing elements are disposed on the circumference, much time and effort are required in work because the wires have to be led within the base portion by avoiding and being insulated from the heating coil. Accordingly, when the wire is led toward the outer circumference on the bottom surface of the top plate, the influences onto unification of the shape and dimension, consumption of the material, and the wire resistance caused by the length of the lead wire are more decreased.

In the heating cooking device of the present invention, a first elastic body in the case of the radiant heater including a heating coil and a base portion that supports the heating coil and is made of a heat insulator can be configured as follows. Namely, the first elastic body is configured by a pair of spring pieces made of metal, and the temperature sensing element is supported on a supporter of ceramics that is fixed to one end side of each of the spring pieces. A pair of lead wires that transmit an electrical signal from the temperature sensing element are connected to the pair of respective spring pieces. A pair of legs made of metal that are integrally joined to or connected and joined to the respective spring pieces are led out to a bottom side of the base portion through the base portion. The spring pieces are used in place of lead wires.

In the case of the first elastic body being configured by a spring made of metal, the spring is preferably made of a precipitation hardening type Ni alloy. The spring configured by the precipitation hardening type Ni alloy can keep an elastic force even if it is heated with cooking.

When a thermostat is provided between the base portion and the top plate in the present invention, the thermostat is preferably disposed between a pair of lead wires, or between a pair of legs.

As described above, in the case of a high power type radiant heater, a thermostat that suppresses the temperature rise of the top plate to a heatproof temperature of the top plate or lower is sometimes provided between the base portion and the top plate. In this case, it is preferable to avoid interference between the thermostat and the lead wires or legs by disposing the thermostat between a pair of lead wires, or between a pair of legs.

In the present invention, a seat that restrains movement of the thermostat is preferably included. The seat can be fixed to the first elastic body. The seat also performs the function of preventing the thermostat from bouncing off, and centrifugal whirling when the cooking container such as a pot drops onto the top plate and an impact is applied.

In the present invention, a heat insulator is preferably disposed around the temperature sensing element.

When the heater is controlled to be on/off by the thermostat, there is the fear that the temperature sensing element receives an influence thereof and cannot detect the temperature of the bottom surface of the top plate correctly. Thus, in order to measure the temperature of the object being cooked located on the surface side via the top plate without transferring the thermal influence from the heating coil to the temperature sensing element as much as possible, the heat insulator is preferably disposed around the temperature sensing element.

In the present invention, the temperature sensing element is preferably housed inside a case made of a heat resistant material.

The glass which is used in the top plate does not have to be broken up to a certain number of dropping times and a certain weight of the pot against the impact caused by dropping of a cooking container such as a pot. This is because by breakage of the glass, a cook is likely to be injured. JIS (Japanese Industrial Standards) has the standard similar to this.

Since the heater unit is pressed against the top plate by the elastic body, the heater unit is temporarily pressed downward if a drop impact occurs to the top plate, but due to the repulsion of the elastic body, the heater unit bounces back toward the top plate.

At this time, similar movement occurs to the temperature sensing element, and the temperature sensing element collides with the top plate, in addition to which, the temperature sensing element is sometimes held between the heater unit which further bounces back and the top plate. When the impact force at this time exceeds the durability of the temperature sensing element, the temperature sensing element is broken. In order to prevent this, the temperature sensing element is preferably housed in a case for reinforcing the temperature sensing element in strength.

As an ordinary temperature sensing element, a thermocouple, a platinum resistor and a thermistor are used.

Among them, a thermocouple requires various efforts such as requiring a series of wire leading to make a hot junction and a cold junction, and wire leading as in the present concept being difficult, temperature compensation for the cold junction with another temperature sensor being required, and electromotive force being about several mVs and requiring a high-powered voltage amplifier with high precision.

In contrast with this, the platinum resistor and the thermistor output temperature signals as resistance values, and therefore, the problem in wire leading is much smaller as compared with a thermocouple. However, for use in a radiant heater, the thermally sensitive characteristic has to correspond to a wide range from a minus range to about 600° C.

In particular, in the case of use as a safety device, it is essential to perform failure detection such as breaking of wire and short-circuiting of the temperature sensing element, and when the resistance value of the temperature sensing element shows an impossible cryogenic temperature, or an ultra-high temperature with means such as a voltage comparator, it is necessary to determine that the temperature sensing element fails.

In order to respond to a wide temperature range like this, the resistance-temperature coefficient of the platinum resistor or the thermistor needs to be made small. In doing so, the resistance change amount per 1° C. becomes small, and therefore, in the case of replacement with a voltage signal, it is necessary to amplify a voltage by using a high-powered voltage amplifier with high precision and input the voltage into the AD converter, and much effort is required for processing of the temperature signal similarly to a thermocouple.

In contrast with this, the heating cooking device of the present invention includes a current passing circuit that supplies a temperature detection current to the temperature sensing element, an AD convertor in which temperature information detected by the temperature sensing element is inputted as an analog voltage signal, and a controller that performs control operation by converting a digital signal converted by the AD convertor into a temperature, and the current passing circuit preferably supplies a temperature detection current in a pulse form to the temperature sensing element based on an instruction of the controller.

Advantageous Effect of Invention

As above, according to the present invention, the safety function and the convenient function can be added to heating and cooking by providing the temperature sensor that indirectly detects the temperature of an object being cooked onto the bottom side of the top plate of the conventional radiant heater with one of the features being less expensive, and contribution is made to wide spread use of an electrical heating cooking device.

BRIEF DESCRIPTION OF DRAWINGS

FIG. 1A is a sectional view thereof, and FIG. 1B is a perspective view of a temperature sensor unit.

FIGS. 2A and 2B show a temperature sensing element unit that is used in the temperature sensor of the first embodiment, FIG. 2A is a vertical sectional view thereof, and FIG. 2B is a sectional view taken along arrows 2b-2b (note that a metallic protection tube 4 is excluded) of FIG. 2A.

FIG. 7A is a plan view, and FIG. 7B is a sectional view taken along arrows 7b-7b of FIG. 7A.

FIG. 8A is a sectional view thereof, and FIG. 8B is a perspective view of a temperature sensor unit.

FIG. 9B is a graph showing a relation of a water temperature and the detection temperature of the temperature sensing element when water is heated, with use of the heating cooking device of FIG. 6 and the heating cooking device of FIGS. 8A and 8B.

FIG. 10A shows a circuit that performs low current DC passage, FIG. 10B shows a circuit that performs high current pulse passage, and FIG. 10C is a diagram showing a current application pattern by the current passing circuit of FIG. 10B.

DESCRIPTION OF EMBODIMENTS

Hereinafter, the invention will be described in detail based on embodiments.
<First Embodiment>

As a heating cooking device 10 according to the present embodiment, an example of a type in which a temperature sensing element is disposed in a central portion in a planar direction of a top plate and a thermostat is not included.

Figure 1A:
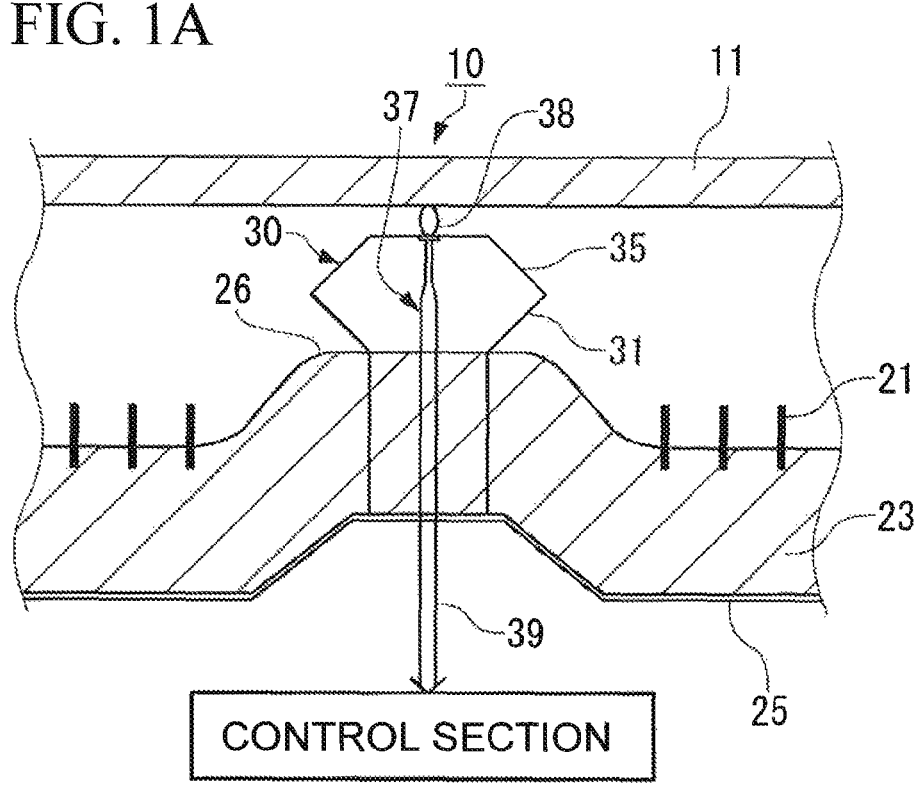
FIGS. 1A and 1B show a main configuration of a heating cooking device according to a first embodiment of the present invention.
Figure 13:
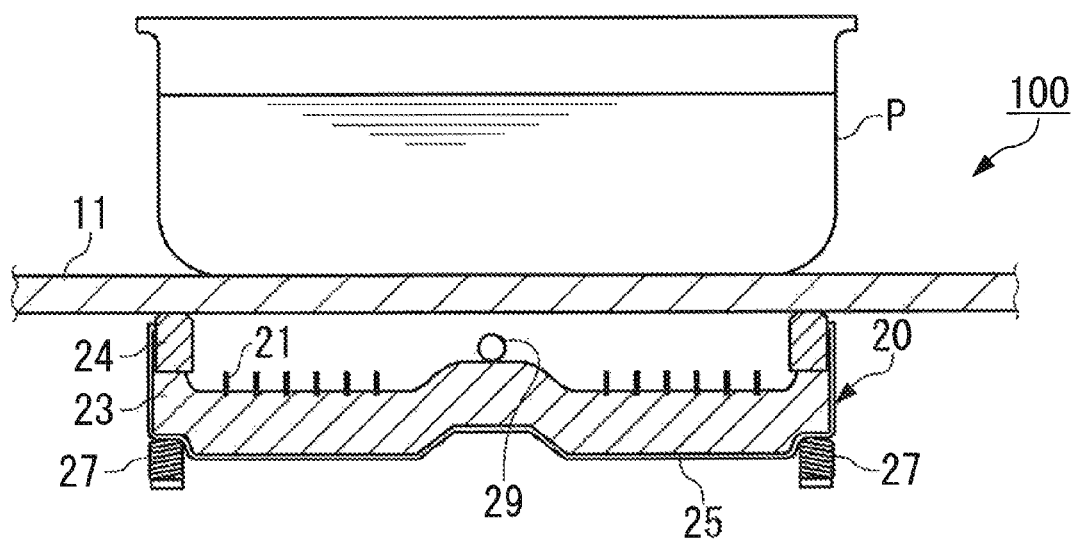
FIG. 13 is a sectional view showing a main configuration of a heating cooking device including a conventional radiant heater.

The heating cooking device 10 is the same as the heating cooking device 100 shown in FIG. 13 in a configuration except for a temperature sensor unit 30. Namely, FIG. 1A shows only a vicinity of the temperature sensor unit 30, and the heating cooking device 10 includes a top plate 11 on which a cooking container P such as a pot is placed, a heating coil 21 that heats the cooking container P, a base portion 23 that holds the heating coil 21 and is made of a heat resistant insulating material, and springs 27 that press the base portion 23 against the top plate 11. The spring 27 configures a second elastic body. On an outer circumferential edge of the base portion 23 a planar shape of which is substantially circular, a spacer 24 rising toward the top plate 11 is included, and a distal end of the spacer 24 is butted to a bottom surface of the top plate 11 (FIG. 13). A space is provided between the base portion 23 except for the spacer 24 and the top plate 11, and the heating coil 21 is exposed in the space.

The temperature sensor unit 30 comprises a support frame 31 and a temperature sensor 37.

The support frame 31 is integrally produced by applying bending to a plate member made of, for example, a precipitation hardening type Ni base alloy that is excellent in high-temperature strength. The support frame 31 comprises a fixing portion 33 and a spring portion 35. As a precipitation hardening type Ni base alloy, JIS NCF750, 751, 80A and the like can be used. Note that the spring portion 35 configures a first elastic body of the present invention.

The fixing portion 33 comprises a pair of legs 331 and 331, and cuffs 332 and 332. The pair of legs 331 and 331 are disposed to oppose each other in parallel and are respectively housed in through-holes (not illustrated) that are formed in the base portion 23. The cuffs 332 and 332 are directed upward from lower ends of the legs 331 and 331.

The spring portion 35 comprises a pair of spring main bodies 351 and 351, and a connecting piece 352. The pair of spring main bodies 351 and 351 are disposed to oppose each other, respectively connected to upper ends of the legs 331 and 331 and bent into L-shapes. The connecting piece 352 connects upper ends of the spring main bodies 351 and 351 to each other.

The temperature sensor 37 comprises a sensor main body 38, and a set of two lead wires 39 that are electrically connected to the sensor main body 38.

In the temperature sensor 37, the sensor main body 38 is disposed on a top surface of the connecting piece 352 of the temperature sensor unit 30. The lead wire 39 is led out to a lower side from the connecting piece 352 through a through-hole (not illustrated) formed in the connecting piece 352.

The temperature sensor unit 30 is assembled to the heater unit 20 as follows.

In a protruded portion 26 that is provided in a center in the planar direction of the base portion 23 of the heater unit 20, a pair of through-holes (not illustrated) through which the legs 331 and 331 of the fixing portion 33 pass are formed. The legs 331 and 331 of the temperature sensor unit 30 are inserted into the through-holes from above the protruded portion 26. The legs 331 and 331 are set at lengths that are substantially equal to a thickness of the protruded portion 26 of the base portion 23. When the cuffs 332 and 332 at the lower ends of the legs 331 and 331 pass through the through-holes, the cuffs 332 and 332 are locked to an undersurface of the base portion 23 (cover 25), and lower ends of the spring main bodies 351 and 351 which connect to the upper ends of the legs 331 and 331 are locked to the top surface of the base portion 23, whereby the legs 331 and 331 are held by the base portion 23.

In this state, the spring portion 35 is disposed in the space between the base portion 23 and the top plate 11, and the sensor main body 38 which is disposed on the top surface of the connecting piece 352 of the spring portion 35 contacts an undersurface of the top plate 11. The spring main bodies 351 and 351 of the spring portion 35 are compressed in a vertical direction more than in a free state. Accordingly, an elastic force works in a direction to move the top plate 11 and the heater unit 20 away from each other. By the elastic force, the sensor main body 38 is pressed against the undersurface of the top plate 11. The elastic force N1 is set to be smaller (N1<N2) than an elastic force N2 of the spring 27 with which the base portion 23 is pressed against the top plate 11. If this is in the opposite relation (N1≥N2), the base portion 23 (spacer 24) moves away from the top plate 11.

The lead wires 39 which are connected to the sensor main body 38 of the temperature sensor 37 are led out to a bottom side of the base portion 23 through the through-holes (not illustrated) formed in the base portion 23, and are connected to wiring that continues to a control section. The through-holes are formed to be larger than diameters of the lead wires 39, and thus the lead wires 39 are movable in an axial direction in the through-holes.

The temperature sensor 37 according to the present embodiment can stably keep precision of detection temperatures even under a high-temperature environment at 600 to 800° C., and preferably includes the following configuration.

As shown in FIG. 2A, the temperature sensor 37 comprises a sensor element unit 1, and a metallic protection tube 4 that houses the sensor element unit 1 except for parts at rear sides of the lead wires 39. The sensor element unit 1 and the metallic protection tube 4 configure the sensor main body 38.

The sensor element unit 1 includes a temperature sensing element 2 with electrical resistance changing in accordance with temperatures, a pair of lead wires 39 which are electrically connected to the temperature sensing element 2 via electrodes 3, and a coating material 5 that seals the temperature sensing element 2 and the lead wires 39 within a predetermined range from the electrodes 3. The lead wires 39 are lead out from a sealing end 6 of the coating material 5.

As the temperature sensing element 2, a thermistor is preferably used, and the thermistors the electrical resistances of which change in accordance with temperatures can be widely applied. In the case of use in a high-temperature range of 500 to 1000° C., a metal oxide that contains Y, Cr, Mn, Ca and O, and has a mole ratio of Y:Cr:Mn:Ca of 75 to 85:7 to 10:7 to 10:1 to 5, which is disclosed in Patent Document 2 in advance by the present inventor, for example, is preferably used as the thermistors. The temperature sensing element 2 which is made of the metal oxide is capable of temperature measurement to a high temperature of 1000° C. or higher. However, this is only an example, and it goes without saying that other thermistors can be used.

As the lead wires 39, platinum or a platinum alloy can be used. As a platinum alloy, the platinum alloy that contains 1 to 20 wt % of iridium is preferable from the viewpoint of high temperature endurance.

The coating material 5 is made of amorphous glass or crystallized glass. Each of them can be used solely, but amorphous glass and crystallized glass can be mixed and used so as to have a desired thermal expansion coefficient.

The sensor element unit 1 includes a sealing end enclosure body 7 made of ceramics, and a lead wire protection tube 8. In the lead wire protection tube 8, a pair of lead wires 39 are housed in a rear side from the sealing end enclosure body 7, while the lead wires 39 penetrate through the lead wire protection tube 8. The sealing end enclosure body 7 and the lead wire protection tube 8 configure a shield of the present invention.

The sealing end enclosure body 7 which is provided between the sensor element unit 1 and the metallic protection tube 4 has an outer shape forming a truncated cone, and surrounds a rear end side of the coating material 5 and encloses the sealing end 6. Accordingly, a conductive composition does not adhere to between the lead wires 39. The sealing end enclosure body 7 is made of ceramics such as alumina ($Al_2O_3$), and silicon nitride ($Si_3N_4$).

In the cylindrical lead wire protection tube 8 continuing to the sealing end enclosure body 7, two holding holes 8h penetrating in the axial direction are formed. In the holding holes 8h, a pair of lead wires 39 are housed and held. In the holding holes 8h, fillers 9 made of ceramics are interposed in gaps except for the lead wires 39.

In order to protect the lead wires 39, the lead wire protection tube 8 preferably has such a length as to be capable of housing regions where a temperature of the lead wires 39 reaches 500° C. or higher when using the temperature sensor 37.

Note that the lead wire protection tube 8 and the filler 9 are also made of alumina ($Al_2O_3$), silicon nitride ($Si_3N_4$) or the like similarly to the sealing end enclosure body 7.

The temperature sensor 37 is produced by inserting and fixing the sensor element unit 1, which is integrally formed in advance, into the metallic protection tube 4 which is separately formed. At this time, a gap is provided between a portion of the shield, which is constituted of the sealing end enclosure body 7 and the lead wire protection tube 8, and the metallic protection tube 4. Thus, the shield is loosely fitted in the metallic protection tube 4.

The temperature sensor 37 includes the metallic protection tube 4 which houses the sensor element unit 1 except for parts of the rear sides of the lead wires 39. The metallic protection tube 4 is made of a stainless alloy, an Ni base superalloy, or other heat resistant alloys.

The metallic protection tube 4 is provided to hold the temperature sensing element 2 and the lead wires 39, and to protect these housed components from mechanical stress from an outside of the metallic protection tube 4.

The metallic protection tube 4 is pipe-shaped, with one end (distal end side) housing the temperature sensing element 2 which measures a temperature being closed (enclosed), and the other end (rear end side) being opened to lead out the lead wires 39.

The reason why the distal end side of the metallic protection tube 4 is enclosed is to isolate a constant environment in the metallic protection tube 4 which houses the temperature sensing element 2 from various atmospheres of oxidization, reduction, sulfidization and the like under a high temperature.

When the temperature sensing element 2 is housed in the metallic protection tube 4 which plays such a role and a high temperature is measured, release (vaporization) of metal occurs with oxidization and reduction on both the outer circumferential surface and the inner circumferential surface of the metallic protection tube 4 in the distal end of the metallic protection tube 4 which has a high temperature. In particular, the inner circumferential surface of the metallic protection tube 4 is under an enclosed environment, and therefore, has a larger metal vaporization amount as compared with the outer circumferential surface.

Meanwhile, as for the temperature distribution, the temperature becomes lower in the region closer to the rear end, and therefore, the metal vaporization amount becomes smaller in the region closer to the rear end of the metallic protection tube 4. This can be explained according to the adherence amount of chrome as one example.

When a metal is vaporized from the lead wire 39, a gap is produced between the coating material 5 and the lead wire 39. In this case, the gap becomes the cause of high-temperature migration when a current is passed to the temperature sensing element 2.

From the above, it is preferable to make the structure which restrains the lead wire 39 from being thinner due to vaporization of the metal under a high temperature, prevents the metal vaporized from the lead wire 39 from scattering to other places; and does not cause the metal scattering from the metallic protection tube 4 and the metal vaporized from the lead wires 39 to adhere to between the lead wires 39. Furthermore, it is preferable to configure the temperature sensor 37 so that the temperature of the lead wires 39 exposed from the lead wire protection tube 8 becomes, for example, 400° C. or lower at which the metal is not vaporized, or even if vaporized, the vaporized amount can be suppressed to an extremely small amount.

Figure 3:
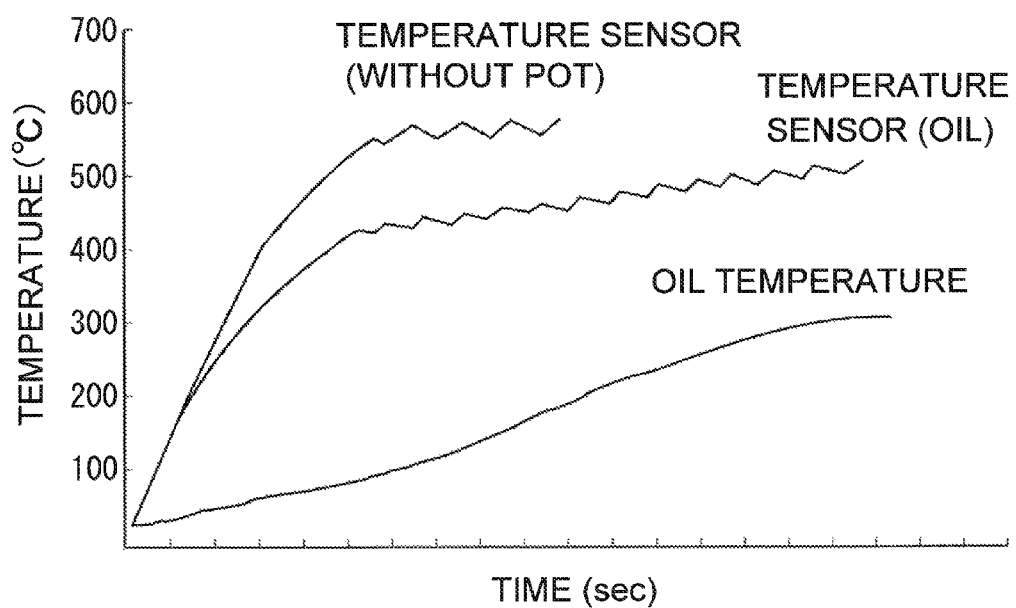
FIG. 3 is a graph showing a relation of an oil temperature and a detection temperature of a temperature sensing element when a deep-frying oil is heated with use of the heating cooking device of the first embodiment.

FIG. 3 shows a relation of an oil temperature of a deep-frying oil heated with use of the heating cooking device 10 according to the present embodiment and a detection temperature of the temperature sensor 37. An axis of abscissa represents an elapsed time, and an axis of ordinates represents a temperature. Note that the detection temperature of the temperature sensor 37 which is measured without providing the cooking container P is also measured.

FIG. 3 shows that there is a certain correlation between the oil temperature and the detection temperature of the temperature sensor 37. Further, even in the case without a pot, the temperature sensor 37 detects the temperature with the characteristic curve different from the characteristic with which the temperature sensor 37 detects the oil temperature. Namely, the temperature of the top plate 11 is detected by the heating cooking device 10 (temperature sensor 37) according to the present embodiment, whereby the temperature of the object being cooked can be indirectly detected. Accordingly, not only a fire can be prevented, but also a fire due to misuse such as use without the cooking container P mounted on the top plate 11 is prevented, and the temperature of the object being cooked can be controlled.

If the temperature of the object being cooked cannot be detected, the oil temperature rises in response to heating of the radiant heater wire, and the oil starts to generate white smoke from the time when the oil temperature exceeds 300° C. and catches a fire at around 330° C.

Figure 4:
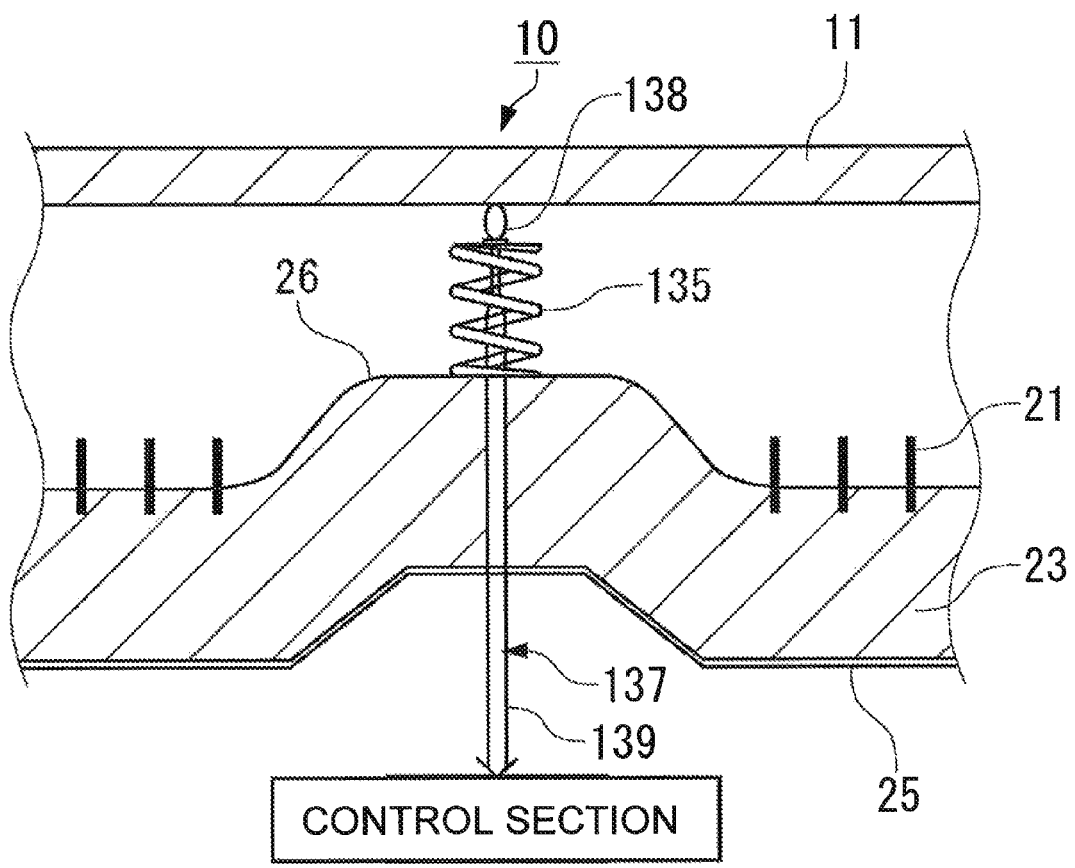
FIG. 4 is a sectional view showing a variation of the first embodiment.

The heating cooking device 10 as above obtains the elastic force with which the sensor main body 38 is pressed against the top plate 11 from a plate spring, but the present invention is not limited to this. For example, as shown in FIG. 4, while the a sensor main body 138 is supported at an upper end of a helical spring 135, a lower end of the helical spring 135 is supported on the base portion 23 (protruded portion 26), whereby a temperature sensor 137 can be configured. Note that the helical spring 135 is compressed more than in a free state. A pair of lead wires 139 and 139 are led out to the bottom side of the base portion 23 through the base portion 23.

Figure 5:
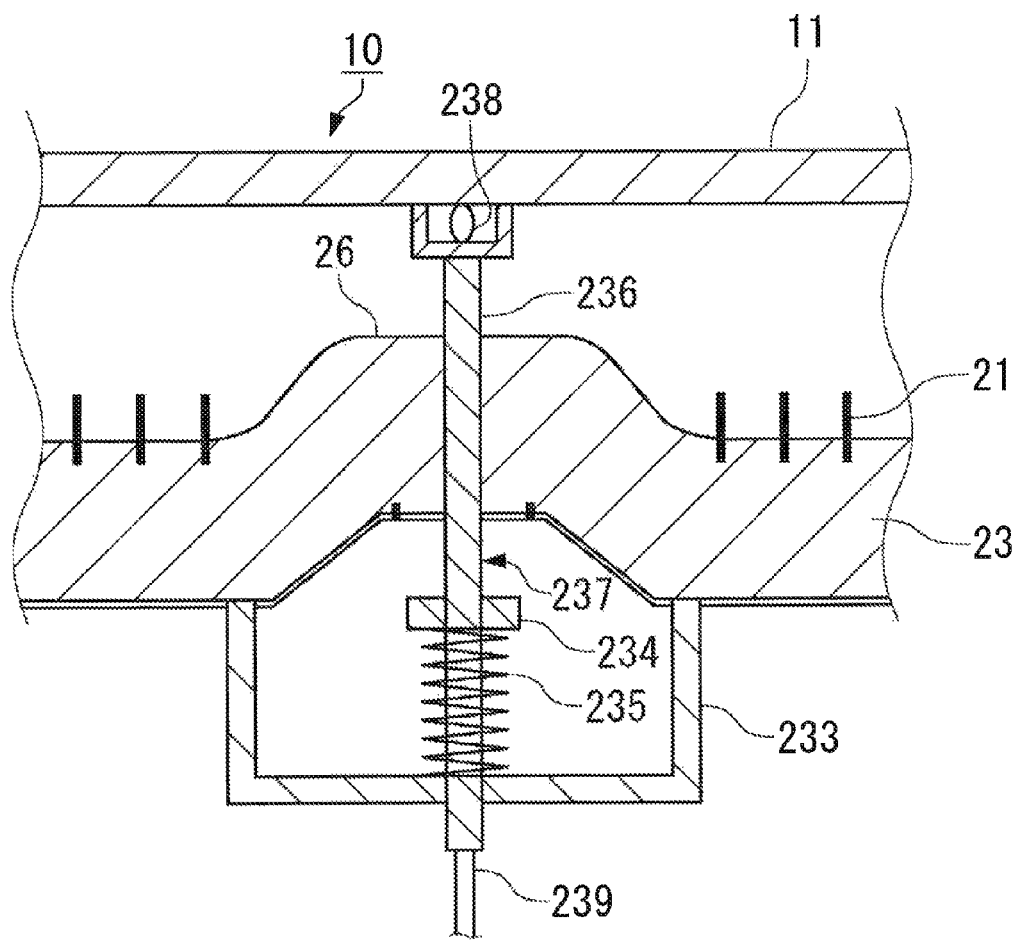
FIG. 5 is a sectional view showing another variation of the first embodiment.

Further, the spring from which the elastic force to press the sensor main body 38 against the top plate 11 is obtained is provided between the base portion 23 and the top plate 11, but the present invention is not limited to this. For example, as shown in FIG. 5, a sensor main body 238 is disposed at an upper end of a support bar 236 that penetrates through the base portion 23 and a frame 233. A spring locking member 234 is fixed to the support bar 236. The spring locking member 234 is provided between the base portion 23 and the frame 233. A helical spring 235 is disposed around the support bar 236, between the spring locking member 234 and the frame 233. Note that the helical spring 235 is compressed more than in a free state.

By the temperature sensors 137 and 237 which are configured as above, the similar effect to the temperature sensor 37 can be provided.

<Second Embodiment>

Figure 1B:
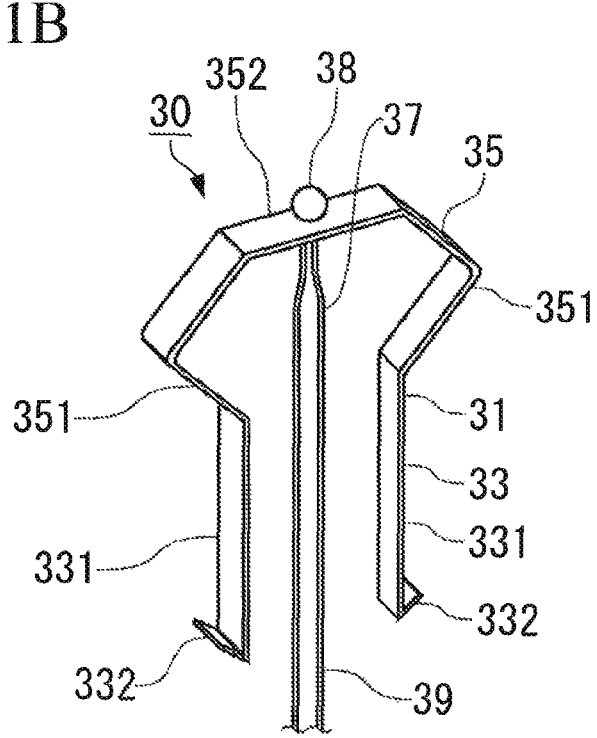
Figure 6:
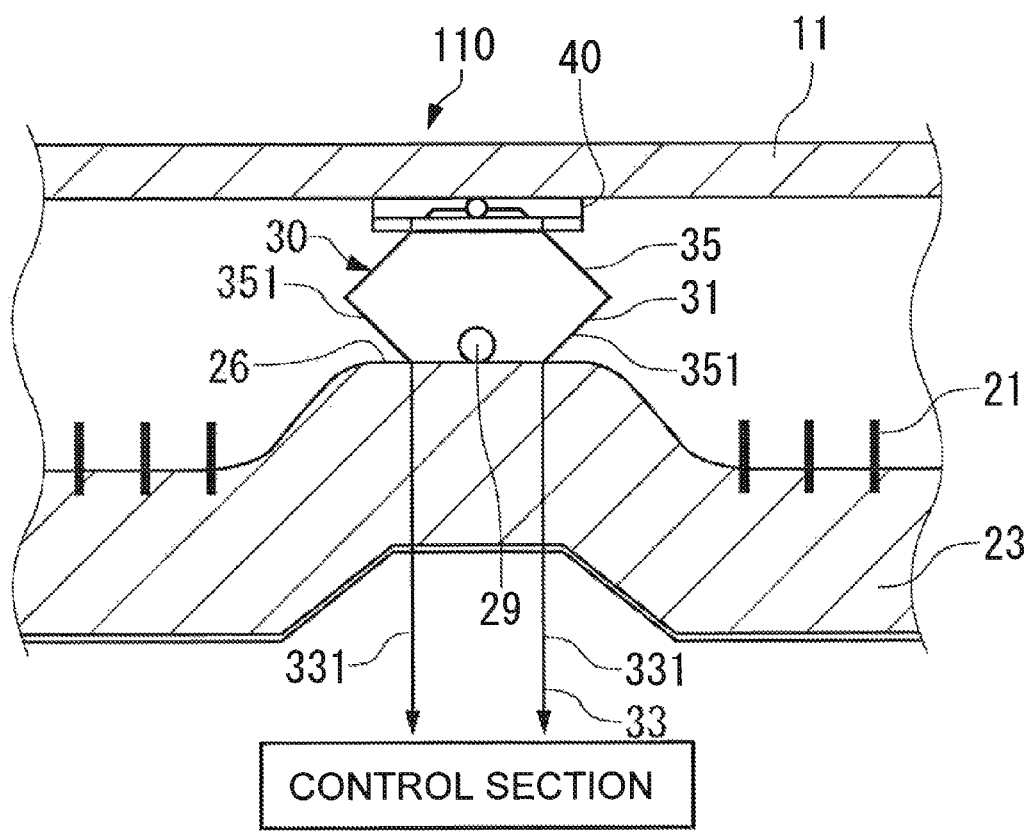
FIG. 6 is a sectional view showing a main configuration of a heating cooking device in an embodiment according to a second embodiment of the present invention.

A second embodiment is applied to a high power type radiant heater in which a thermostat 29 is provided on the base portion 23, as shown in FIG. 6. Note that the same components as in the first embodiment are assigned with the same reference signs as in FIGS. 1A,1B and 13.

A heating cooking device 110 according to the second embodiment also presses the sensor main body 38 against the top plate 11 by the spring portion 35 of the support frame 31 similarly to the heating cooking device 10 according to the first embodiment.

However, in the first embodiment, the sensor main body 38 is directly pressed against the top plate 11, whereas in the second embodiment, the sensor main body 38 is housed inside a ceramics case 40, and contacts the bottom surface of the top plate 11 via the ceramics case 40.

The ceramics case 40 includes a base 41 made of ceramics, a cap 42 that is disposed to oppose to the base 41 and made of ceramics, and a sealing tube 45 that fixes the base 41 and the cap 42 and is made of metal. The base 41 and the cap 42 are made of ceramics such as alumina ($Al_2O_3$) and silicon nitride ($Si_3N_4$).

The base 41 is fixed to the spring portions 35 and is supported by the support frames 31. Upper end portions of the spring portions 35 (support frames 31) penetrate through the base 41 and protrude into a housing chamber 43 that is formed in the cap 42.

The sensor main body 38 is housed in the housing chamber 43. The sensor main body 38 is disposed to contact an inner surface of a ceiling of the cap 42 as shown in FIG. 7B. Since a top surface of the cap 42 contacts the bottom surface of the top plate 11, the sensor main body 38 contacts the bottom surface of the top plate 11 via the ceiling of the cap 42. A gap is provided between the sensor main body 38 and the base 41. This is for preventing the sensor main body 38 from being broken by being held between the ceiling of the cap 42 and the base 41 when an impact is applied from the top surface of the cap 42.

The lead wires 39 which connect to the sensor main body 38 are electrically connected to the spring portions 35 respectively. Namely, in this embodiment, the spring portions 35 play the role of lead wires.

A step 44 that continues in a circumferential direction is formed at an outer circumferential portion of the top surface of the cap 42, and an upper locking ring 46 of the sealing tube 45 is locked to the cap 42 in the step 44. The upper locking ring 46 continues in the circumferential direction and is locked throughout an entire circumference of the step 44. Lower locking claws 47 of the sealing tube 45 are formed at a plurality of spots in the circumferential direction, and are locked to an undersurface of the base 41.

A portion near to a center from the step 44 of the cap 42 protrudes upward from the upper locking ring 46 of the sealing tube 45, in other words, toward the top plate 11. This is for the following reason. Namely, when the metallic sealing tube 45 is used under a high temperature, an oxide film is formed on a surface thereof. The oxide film becomes thicker with use time. Accordingly, if the top surface of the cap 42 and a top surface of the sealing tube 45 are produced to be flush with each other, an oxide film is formed on the top surface (surface facing the top plate 11) of the upper locking ring 46 of the sealing tube 45, contact of the top surface of the cap 42 and the bottom surface of the top plate 11 is released. In order to prevent this and ensure contact of the cap 42 and the top plate 11 for a long period, the portion near to the center from the step 44 of the cap 42 is protruded toward the upper side from the upper locking ring 46 of the sealing tube 45.

The thermostat 29 is disposed between a pair of spring main bodies 351 and 351 that act as lead wires, and legs 331 and 331 that continue to the spring main bodies 351 and 351 are led out to the bottom side of the base portion 23. The legs 331 and 331 also penetrate through the cover 25, but electrical insulation is applied to both of them. The same thing applies to an example of FIGS. 8A,8B.

Figure 8A:
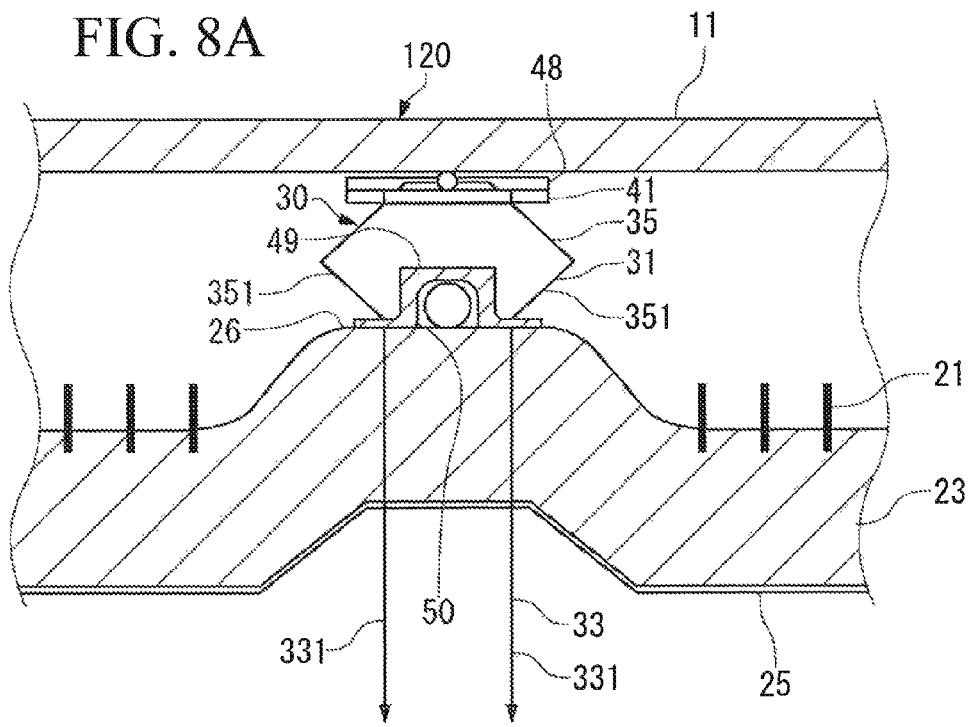
FIGS. 8A and 8B show a variation of the second embodiment.
Figure 8B:
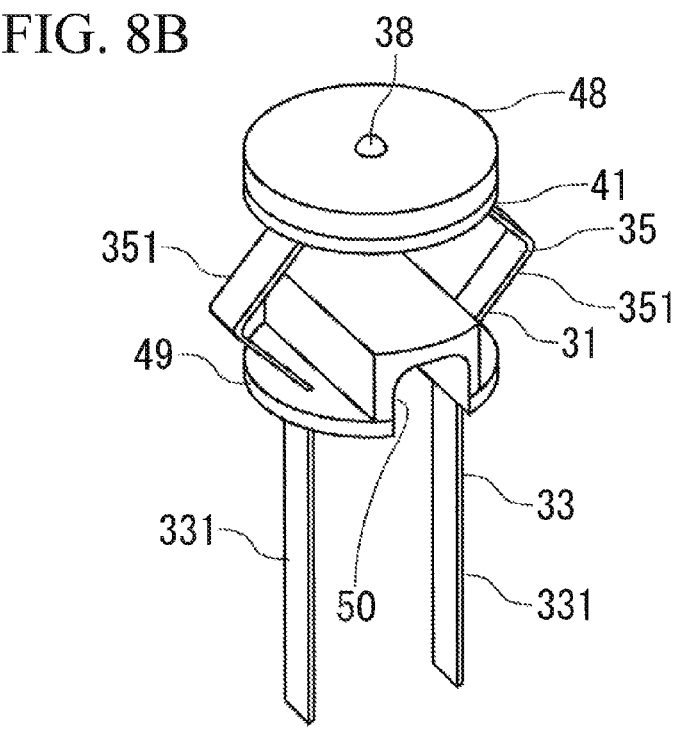

The present invention is not limited to that the whole of the sensor main body 38 is covered with the ceramics case 40, and a heating cooking device 120 in which a part of a lower side of the sensor main body 38 is buried in a burial portion 48 made of an insulating material can be adopted as shown in FIGS. 8A,8B. An upper end of the sensor main body 38 which is exposed from the burial portion 48 is pressed against the top plate 11. As a heat insulator that is used in the burial portion 48, for example, unwoven fabric made of ceramics fiber can be employed.

In the example shown in FIGS. 8A,8B, a seat 49 made of ceramics is provided between the pair of spring main bodies 351 and 351. The seat 49 includes a housing groove 50. The seat 49 itself is fixed to the protruded portion 26, or the legs 331 are fixed to the protruded portion 26, or to the cover 25, so that the seat 49 is not lifted up from the protruded portion 26. A part of the thermostat 29 is housed in the housing groove 50. In this manner, even if the cooking container P such as a pot falls on the top plate 11 and an impact is applied, the thermostat 29 is prevented from bouncing off to the top plate 11 or centrifugal whirling by the force received from the base portion 23, and is also prevented from contacting the support frame 31 (spring portion 35).

The seat 49 is attached by using the spring main bodies 351 and 351 which are located between the base portion 23 and the top plate 11, but in the mode in which the helical spring 235 is placed below the base portion 23 as shown in FIG. 5, prevention of bounding-off of the thermostat 29 and the like as a result of providing the seat 49 are difficult.

Figure 7A:
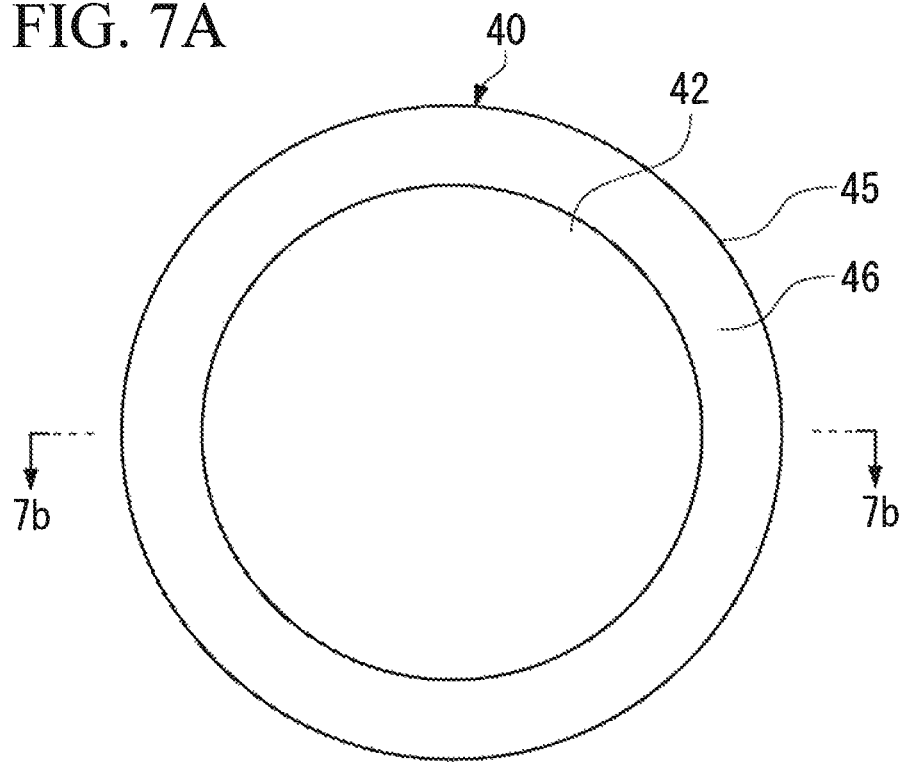
FIGS. 7A and 7B show a configuration of a ceramics case according to the second embodiment.
Figure 7B:
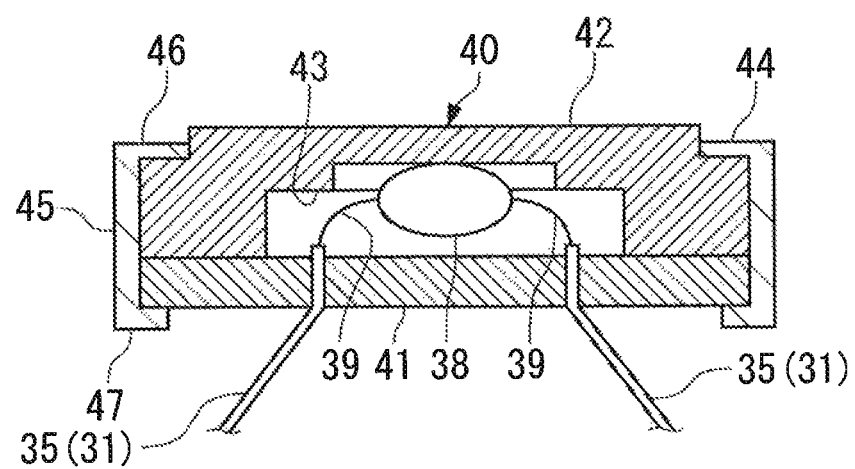

Further, concerning the example shown in FIGS. 8A,8B, the sensor main body 38 can be housed by the ceramics case 40 shown in FIG. 6 and FIGS. 7A,7B, and concerning the examples shown in FIG. 6 and FIGS. 7A,7B, the upper portion of the sensor main body 38 can be exposed as shown in FIGS. 8A,8B.

Figure 9A:
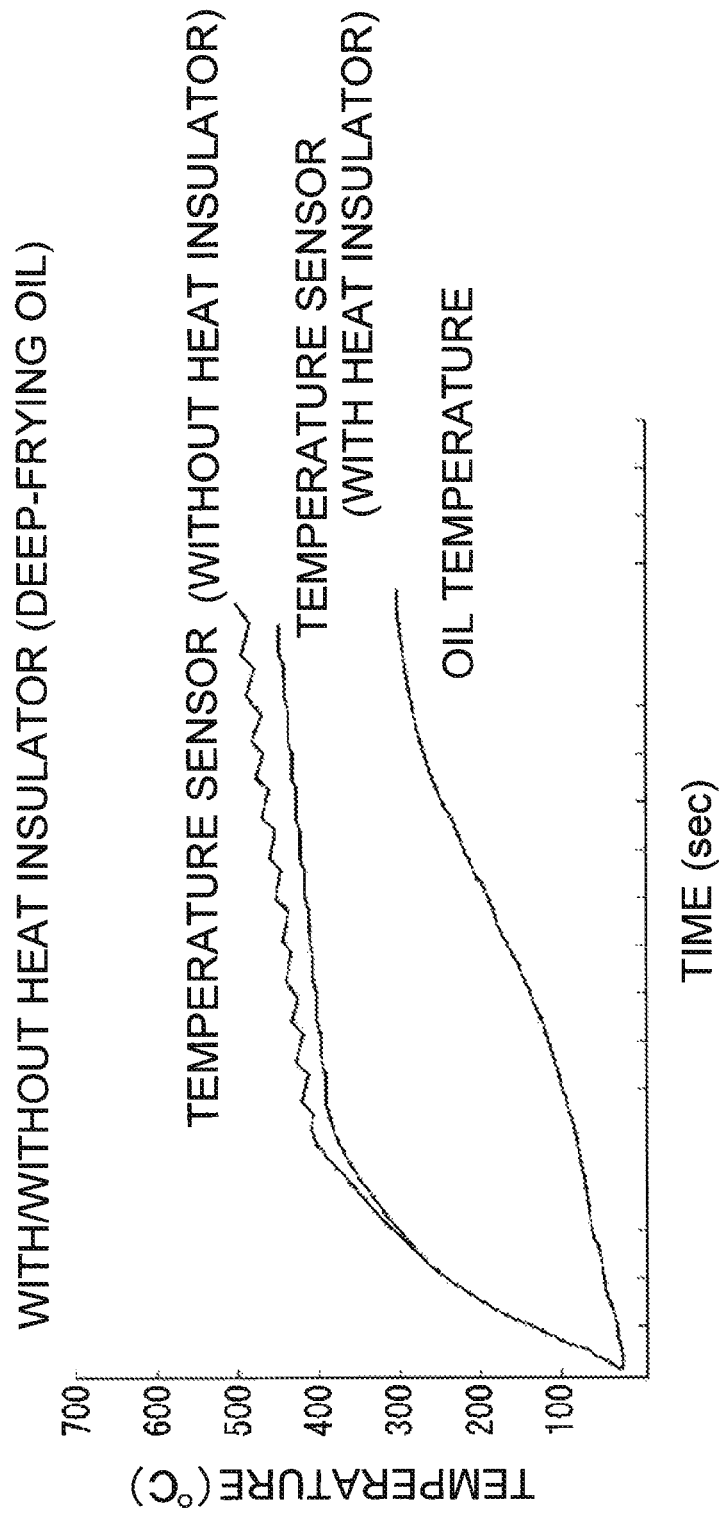
FIG. 9A is a graph showing a relation of an oil temperature and a detection temperature of a temperature sensing element when a deep-frying oil is heated.

FIG. 9A shows the result of evaluating a difference in the thermal sensitivities between the heating cooking device 110 ("without a heat insulator") and the heating cooking device 120 ("with a heat insulator"). A graph of FIG. 9A shows the oil temperature of a heated deep-frying oil and the temperatures detected by the temperature sensors of the respective cooking devices.

From FIG. 9A, it is confirmed that by providing the heat insulator, the influence of a temperature ripple to the temperature sensing element caused by turning ON/OFF energization of the heater can be reduced, and result in excellent temperature detection performance.

Next, FIG. 9B shows thermal sensitivity characteristics in the case of performing water boiling.

In FIG. 9B, the transition of the detection temperature in the case of actually performing water boiling is shown by the curve assigned with "TEMPERATURE SENSOR (WATER BOILING)". Further, the temperature of the boiled water is shown by the curve assigned with "WATER TEMPERATURE".

When the temperature of water rises and a boiled state is brought about, "WATER TEMPERATURE" indicates a constant temperature at 100° C. At this time "TEMPERATURE SENSOR (WATER BOILING)" indicates a constant temperature a little later. Accordingly, from the fact that the constant temperature is achieved, it can be detected that water is boiled at 100° C. When boiling is further continued, plenty of water is vaporized, and the pot becomes empty, the temperature detected by the "TEMPERATURE SENSOR (WATER BOILING)" abruptly starts to rise after a "HEATING EMPTY POT" point, whereby it can be detected that the pot becomes empty. For example, when water in a stewed object is all vaporized during cooking of the object being stewed, and the stewed object starts to be burned, the similar behavior of the temperature rise can be observed.

Further, FIG. 9B additionally presents the case of heating without a pot placed on the top plate 11 ("TEMPERATURE SENSOR (WITHOUT POT)"), and the case of heating an empty pot from the beginning ("TEMPERATURE SENSOR (WITHOUT WATER)"). In both the cases, the temperature rise exceeding 500° C. occurs at a dash, and therefore, by detecting this, misuse can be detected.

As above, according to the present invention, a convenient function of keeping a cooked object warm based on boiling detection, and further, a convenient function and a safety function such as burning detection and detection of heating without water can be both included.

Figure 10A:
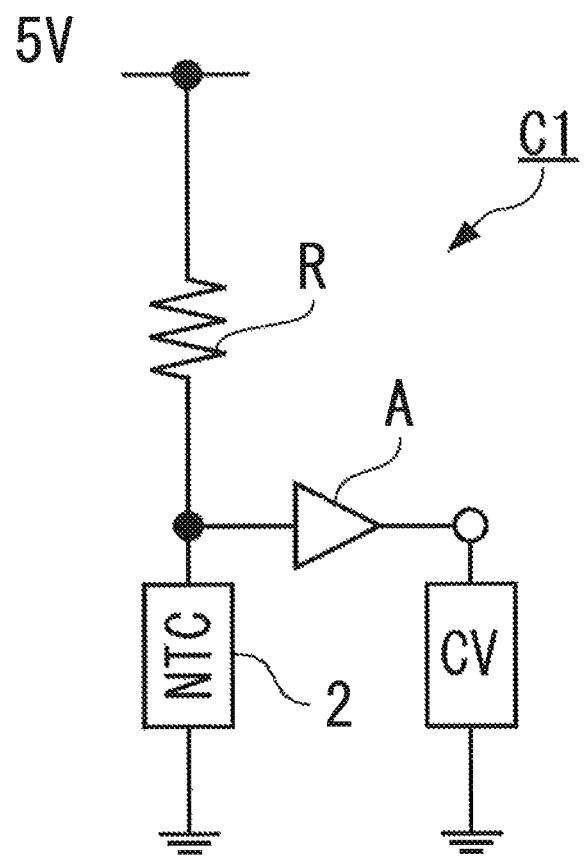
FIGS. 10A, 10B and 10C are views showing a configuration of a current passing circuit for a temperature sensor.
Figure 10B:
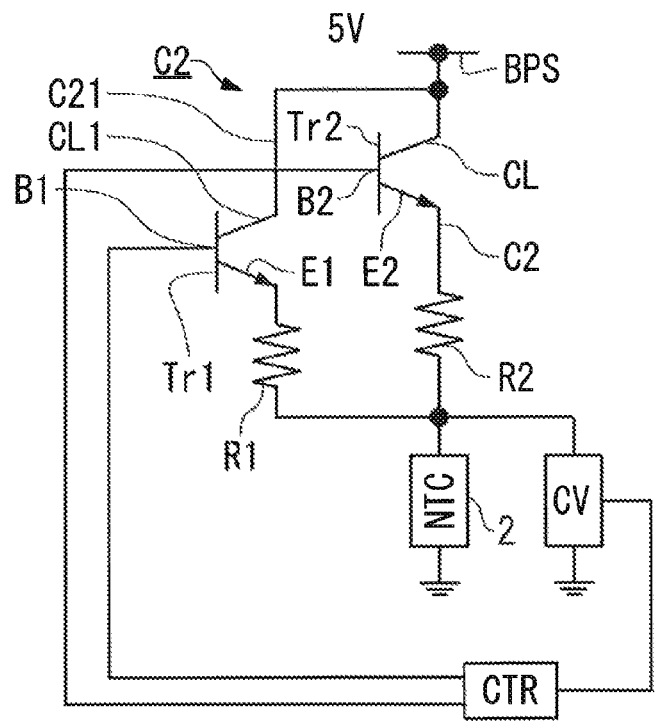

FIG. 10B shows a pulse current passing circuit in the case of use of a thermistor for the temperature sensing element in the heating cooking device 120.

Figure 11A:
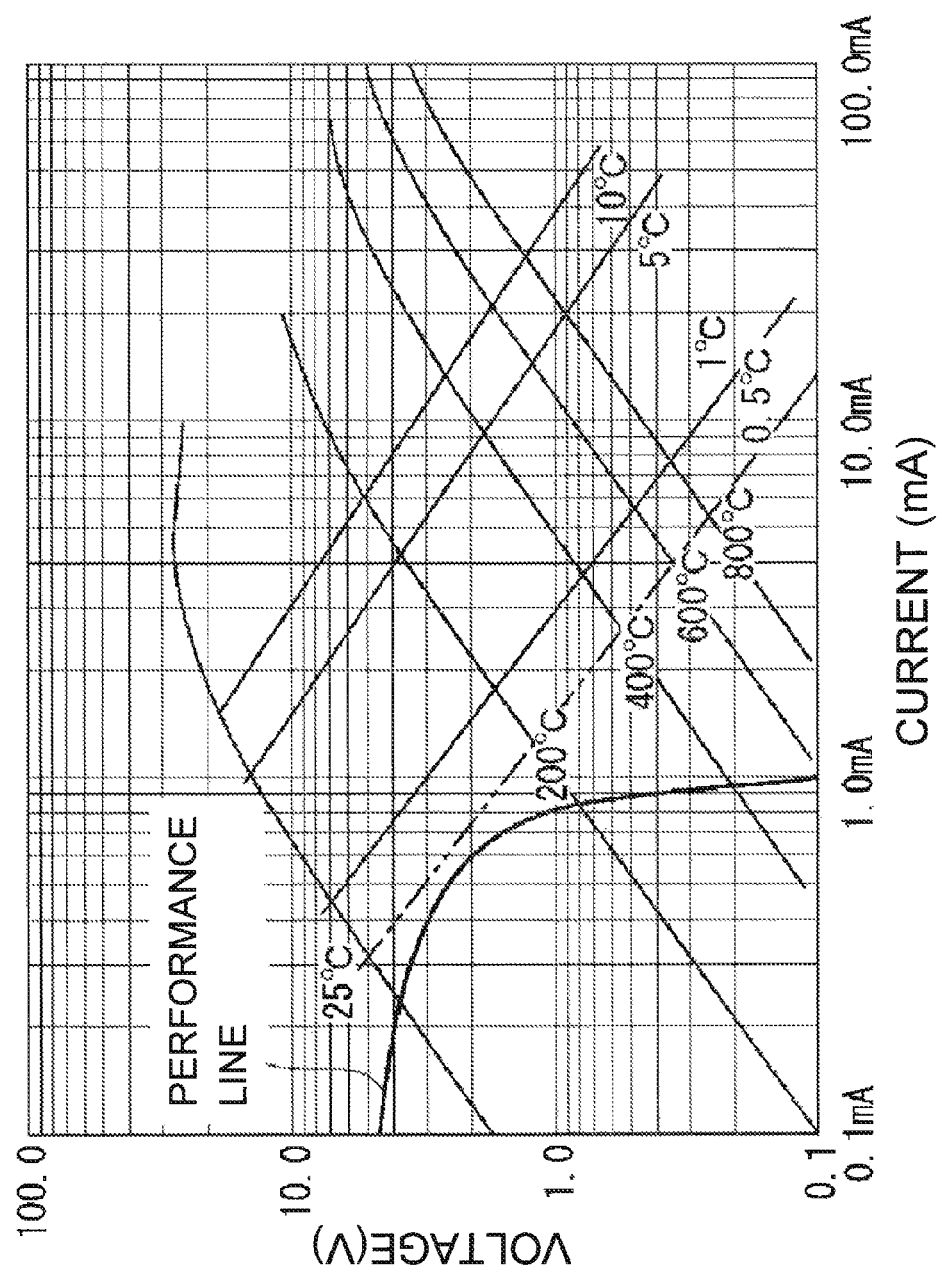
FIG. 11A is a graph showing I-V characteristics and a performance line in a case of performing current passage with the circuit of FIG. 10A.

FIG. 11A shows I-V (current-voltage) characteristics in still air at 25° C., 200° C., 400° C., 600° C. and 800° C. of the thermistor according to the present embodiment. The I-V characteristics are the result of plotting terminal voltages of the thermistor at the time of passing a constant current to the thermistor onto a double logarithmic graph with an axis of ordinates representing voltage values, and an axis of abscissa representing current values.

As shown in FIG. 11A, while the thermistor does not self heats with Joule heat, the voltage value increases diagonally rightward at 45° in response to the current value of the constant current that is passed to the thermistor. When the thermistor gradually starts self heating by Joule heat, rise of the voltage value declines, and when the voltage passes a voltage maximum point, the voltage value changes to decrease. In general, the thermistor shows the I-V characteristics like this.

Further, the graph of FIG. 11A shows a plot which is diagonally upward to the left and displays the power consumption of temperature rise by 0.5° C., 1° C., 5° C. and 10° C. from the ambient temperature in response to the power consumption of the thermistor according to the present embodiment. For example, rise by 0.5° C. indicates that the temperature of the thermistor becomes 25.5° C. though the ambient temperature is 25° C., and the temperature higher by 0.5° C. than the ambient temperature of 25° C. is detected.

A heat dissipation constant (W/° C.) of a thermistor described in general is the heat dissipation constant at the time of the thermistor self heating by 1° C. by Joule heat. Since this is a constant, the self heating temperature is originally diagonally upward to the left at 45° C., but when measurement is performed in a wide temperature range, the heat transfer mode (conduction/convection/radiation) slightly changes in the actual measurement though it is in still air, and therefore, the result as shown in FIG. 11A is frequently obtained.

Further, the thermistor showing the I-V characteristics like this as a single body is connected to a current passing circuit Cl shown in FIG. 10A. FIG. 11A shows a performance line of the thermistor which is the result of plotting a voltage value inputted into an amplifier A and a current value flowing into the thermistor on the I-V characteristic chart.

A resistance value of a series resistance R which restricts a current to be passed to the thermistor is properly selected so that the self heating amount shown by the I-V characteristics of the thermistor becomes an allowable error or less.

Figure 11B:
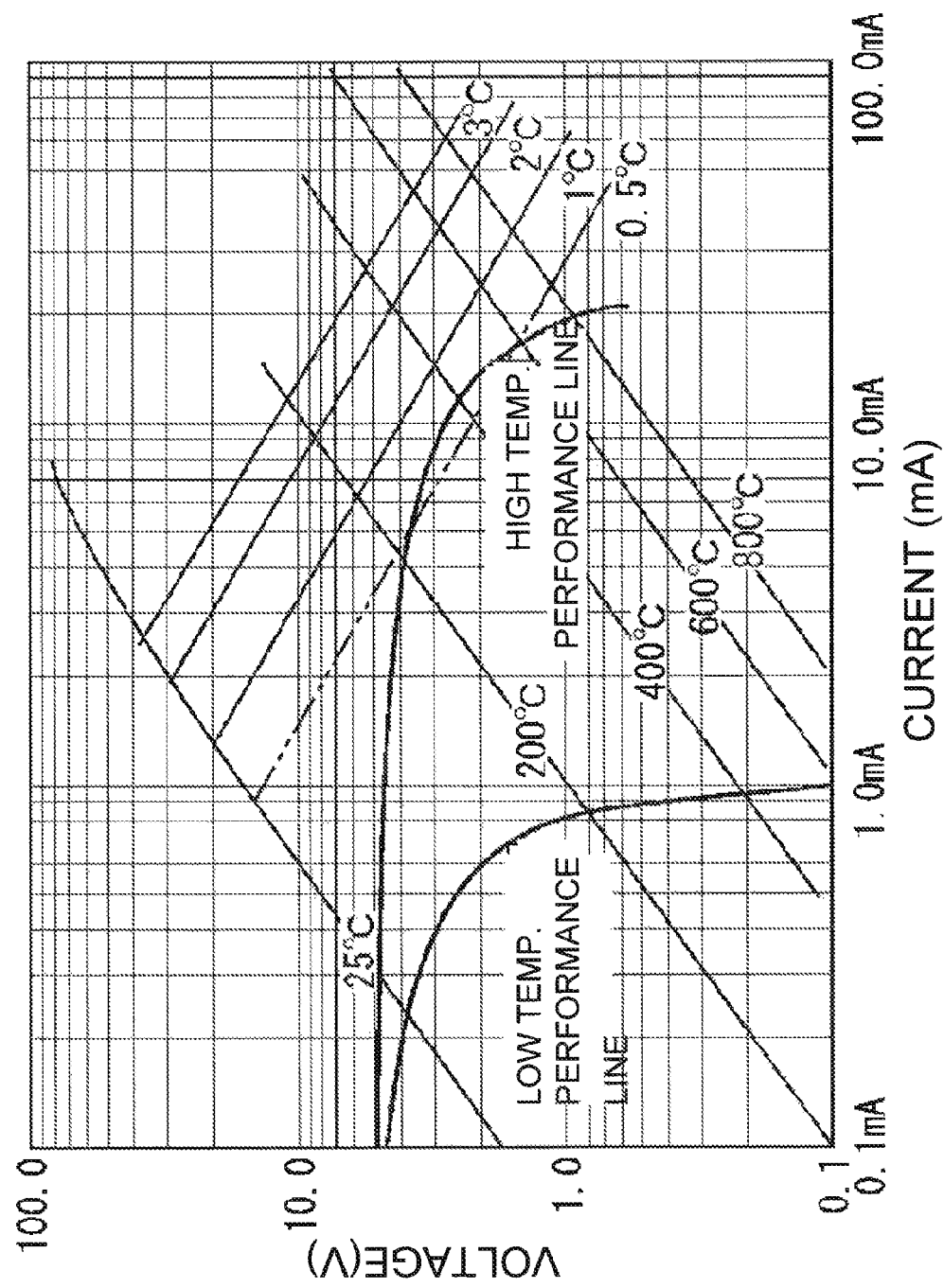
FIG. 11B is a graph showing I-V characteristics and a performance line in a case of performing current passage with the circuit of FIG. 10B.
Figure 12:
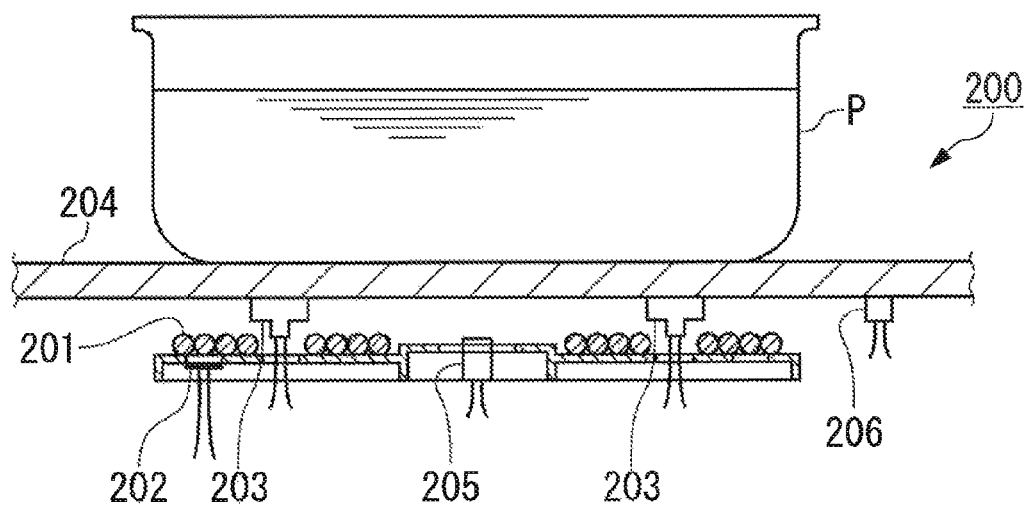
FIG. 12 is a sectional view showing a main configuration of a conventional IH heating cooking device.

In the case of the embodiment, between the ambient temperatures of 25° C. and 200° C., the self heating temperature becomes the maximum, and FIG. 11B shows that the value is 0.5° C. or lower.

Further, at the same time, an intersection of the I-V characteristics and the performance line represents a voltage value that is inputted into the amplifier A when the temperature is measured by the current passing circuit Cl shown in FIG. 10A. For example, if the ambient temperature is 25° C., the voltage value is 3.8 V, and if the ambient temperature is 200° C., the voltage value is 0.8 V.

FIG. 11B shows pulse I-V characteristics in still air at 25° C., 200° C., 400° C., 600° C. and 800° C. of the same thermistor as shown in FIG. 11A. The pulse I-V characteristics are the result of plotting terminal voltages of the thermistor which are generated in a pulse form in accordance with a current passing period when a pulse constant current with the current passing period configured by a time period (ON) in which the current is passed to the thermistor and a time period (OFF) in which a current is not passed being determined is passed, into a double logarithmic graph in which an axis of ordinates represents a pulse voltage value and an axis of abscissa represents a pulse current value.

Since the thermistor performs self heating little by little even during the ON time period, the thermistor performs self heating significantly if the current passing time period is long. Therefore, by performing pulse current passage, the time period in which current passage is OFF is provided to cool the thermistor.

Even in pulse current passage, the following matters occur similarly: the voltage value rises diagonally rightward at 45° in response to the current value of the current passed to the thermistor as a pulse constant current while the thermistor does not self heat by Joule heat; the rise of the pulse voltage value declines when the thermistor gradually starts self-heating by Joule heat; and the pulse voltage value changes to lower when the voltage value passes the voltage maximum point.

Further, the graph of FIG. 11B also shows a plot which is diagonally upward to the left and displays the consumption power with which the thermistor rises in temperature by 0.5° C., 1° C., 2° C. and 3° C. from the ambient temperature in response to the consumption power by pulse current passage thereof similarly to FIG. 11A.

When FIG. 11A and FIG. 11B are compared, the temperature rise becomes smaller even with the same power consumption when current is passed by pulse. Therefore, the pulse I-V characteristics have a much larger voltage maximum point as compared with the I-V characteristics by continuous current passage.

Further, FIG. 11B shows a performance line of the thermistor which is obtained by plotting the voltage value which is inputted into an AD converter CV and a current value flowing into the thermistor when the thermistor which shows the pulse I-V characteristics like this as a single body is connected to the current passing circuit C2 shown in FIG. 10B, on the I-V characteristic chart.

Here, the circuit of FIG. 10B will be described. The current passing circuit C2 can switch transistors Tr1 and Tr2 in two current passing circuits constituted of a first current passing circuit C21 and a second current passing circuit C22 by a signal from a controller CTR.

The second current passing circuit C22 measures a high temperature side, and a resistance value of a current limiting resistor R2 is properly selected so that the self heating amount of the thermistor shown in the pulse I-V characteristics becomes an allowable error or less. FIG. 11B shows that in the case of the present embodiment, the self heating temperature becomes the maximum at an ambient temperature of 400° C., and the value thereof is 1° C. or less.

The first current passing circuit C21 measures a low temperature side, and the resistance value of the current limiting resistor R1 is the same as the limiting resistor R of the current passing circuit C1 shown in FIG. 10A.

Figure 10C:
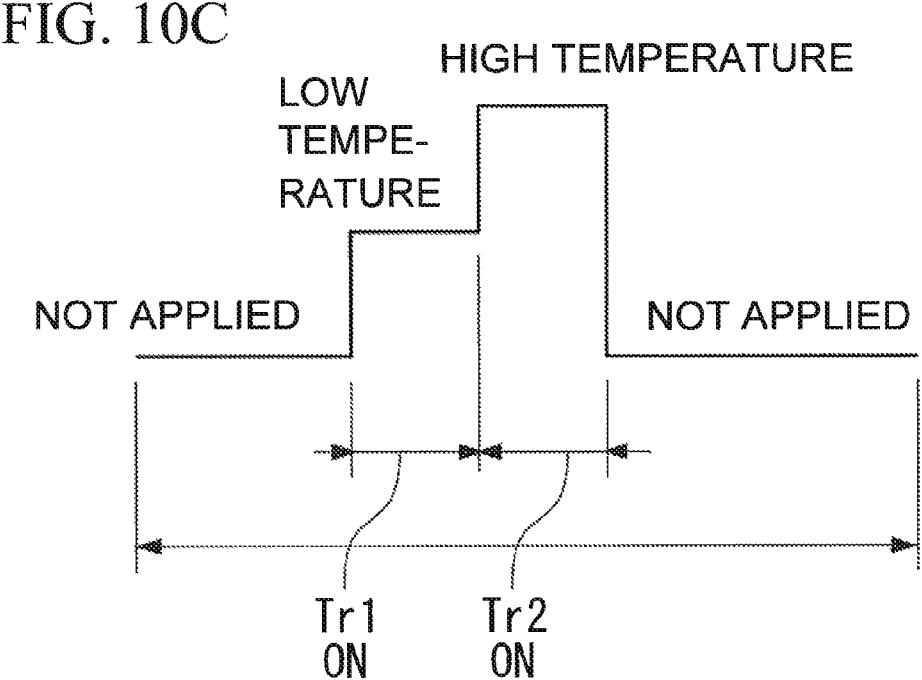

Next, FIG. 10C shows timing for passing current to the thermistor by switching the transistors Tr1 and Tr2 in the current passing circuit shown in FIG. 10B.

A time period in which the transistor Tr1 at the low temperature side is OFF, and the transistor Tr2 at the high temperature side is ON is the same as the current passing period of the pulse constant current that is used when pulse I-V is measured with the thermistor as a single body.

A time period in which the transistor Tr2 at the high temperature side is OFF, and the transistor Tr1 at the low temperature side is ON is substantially the same as what the current passing circuit shows in FIG. 10A. Accordingly, even with continuous current passing, self heating is sufficiently small, and therefore, when measurement at the low temperature side is completed within the pulse current passing period at the high temperature side, current may be passed in a pulse form, or current may be continuously passed. FIG. 10C shows the example of performing pulse current passage.

Since the current passing circuit C2 has two circuits that are the first current passing circuit C21 and the second current passing circuit C22, two performance lines are shown in FIG. 11B, and intersections of the respective performance lines and the pulse I-V characteristics are present.

When current is passed with the period shown in FIG. 10C, two voltage signals at the high temperature side and the low temperature side are inputted into the AD converter CV one time for each and are transmitted as digital signals to the controller CTR during one period.

The controller CTR determines that the present temperature is 400° C. or higher if the voltage value at the low temperature side is less than 0.2 V, and the controller CTR calculates the voltage value at the high temperature side which is inputted next to calculate the present temperature.

In contrast with this, if the voltage value at the low temperature side is 0.2 V or more, the controller CTR determines that the present temperature is lower than 400° C. and calculates the voltage value at the low temperature side to calculate the present temperature.

Note that the two current passing circuits that are the first current passing circuit C21 and the second current passing circuit C22 are provided to correspond to the low temperature region and the high temperature region here, and for example, when the measurement temperature region is divided into three that are a low temperature region, an intermediate temperature region and a high temperature region, three current passing circuits are provided. Namely, the current passing circuit of the present invention can include at least two current passing circuits, and providing three or more current passing circuits is allowed.

In order to measure the high temperature region with continuous current passage, it is essential to suppress the self heating amount by lowering the applied voltage 5 V to, for example, 0.5 V in the case of the current passing circuit C1 of FIG. 10A, and combine the amplifier A with high precision.

In contrast with this, if measurement can be performed by suppressing self heating by adopting pulse current passage in only measurement of the high temperature region, the amplifier with high precision is not required, and a control circuit that is economically excellent can be provided.

Measurement may be performed from the low temperature region to the high temperature region with pulse current passage as a matter of course.

REFERENCE SIGNS LIST

1 . . . sensor element unit, 2 . . . temperature sensing element, 3 . . . electrode, 4 . . . metallic protection tube, 5 . . . coating material, 6 . . . sealing end 7 . . . sealing end enclosure body, 8 . . . lead wire protection tube, 8h . . . holding hole, 9 . . . filler 10, 110, 120 . . . heating cooking device 11 . . . top plate 20 . . . heater unit, 21 . . . heating coil, 23 . . . base portion, 24 . . . spacer, 25 . . . cover 26 . . . protruded portion, 27 . . . spring, 29 . . . thermostat 30 . . . temperature sensor unit, 31 . . . support frame, 33 . . . fixing portion, 35 . . . spring portion 37, 137, 237 . . . temperature sensor, 38, 138 . . . sensor main body, 39 . . . lead wire 40 . . . ceramics case, 41 . . . base, 42 . . . cap 43 . . . housing chamber 44 . . . step, 45 . . . sealing tube, 48 . . . burial portion, 49 . . . seat 233 . . . frame, 234 . . . spring locking member, 236 . . . support bar 331 . . . leg, 351 . . . spring main body, 352 . . . connecting piece C1, C2, C21, C22 . . . current passing circuit, CTR . . . controller, CV . . . AD converter Tr1, Tr2 . . . transistor P . . . cooking container

The invention claimed is:

1. A heating cooking device, comprising:
   a top plate with a cooking container placed on a surface thereof;
   a radiant heater that is placed at a predetermined distance from the top plate;
   a spacer that is provided between the top plate and the radiant heater, and defines the predetermined distance;
   a temperature sensing element that contacts a bottom surface of the top plate directly or indirectly and measures a temperature of the top plate;
   a first elastic body, one end side of which is supported by the radiant heater, and the other end side of which presses the temperature sensing element against the top plate; and
   a second elastic body that presses the radiant heater toward the top plate,
   wherein an elastic force N1 with which the first elastic body presses the temperature sensing element against the top plate is smaller than an elastic force N2 with which the second elastic body presses the radiant heater toward the top plate,
   wherein the radiant heater includes
   a heating coil, and a base portion that is made of a heat insulator and supports the heating coil,
   the first elastic body is configured by a pair of spring pieces made of metal,
   a pair of lead wires that transmit an electrical signal from the temperature sensing element are connected to the pair of respective spring pieces, the temperature sensing element being supported on a supporter of ceramics that is fixed to one end side of each of the spring pieces, and
   a pair of legs made of metal that are integrally joined to or connected and joined to the respective spring pieces are led out to a bottom side of the base portion through the base portion.

2. The heating cooking device according to claim 1, wherein a thermostat provided between the base portion and the top plate is disposed between the pair of lead wires, or between the pair of legs.

3. The heating cooking device according to claim 2, further comprising:
   a seat that restrains movement of the thermostat toward the top plate,
   wherein the seat is fixed to the first elastic body.

4. The heating cooking device according to claim 1, wherein a heat insulator is disposed around the temperature sensing element.

5. The heating cooking device according to claim 1, wherein the temperature sensing element is a thermistor.

6. The heating cooking device according to claim 1, wherein the elastic body is formed by a spring made of a precipitation hardening type Ni alloy.

7. The heating cooking device according to claim 1, wherein the temperature sensing element is housed inside a case made of a heat resistant material.

8. The heating cooking device according to claim 1, further comprising:
   a current passing circuit that supplies a temperature detection current to the temperature sensing element;
   an AD convertor in which temperature information detected by the temperature sensing element is inputted as an analog voltage signal; and
   a controller that performs control operation by converting a digital signal converted by the AD convertor into a temperature,
   wherein the current passing circuit
   supplies a temperature detection current in a pulse form to the temperature sensing element based on an instruction of the controller.

* * * * *